United States Patent

[11] 3,624,510

[72] Inventor Lyle Bruce Juroff
Indianapolis, Ind.

[21] Appl. No. 818,222
[22] Filed Apr. 22, 1969
[45] Patented Nov. 30, 1971
[73] Assignee RCA Corporation

[54] THRESHOLD DIGITAL SWITCH CIRCUIT FOR REMOTE CONTROL SYSTEM

15 Claims, 1 Drawing Fig.

[52] U.S. Cl. .......... 325/392, 317/147, 343/228
[51] Int. Cl. .......... H04b 1/06
[50] Field of Search .......... 307/324, 316; 317/147; 325/392, 64, 55, 391, 393; 343/225, 227, 228; 179/15 ST

[56] References Cited

UNITED STATES PATENTS

| | | | |
|---|---|---|---|
| 3,027,497 | 3/1962 | Carlson et al. | 325/392 |
| 3,288,936 | 11/1966 | Jabber | 175/15 ST |

OTHER REFERENCES

IBM Tech. Disclosure Vol. 1, No. 6 April 1959 pg. 27
Static Relays For Electronic Crts. Edited by Blake Engineering Publishers, Elizabeth N.J.

*Primary Examiner*—Robert L. Griffin
*Assistant Examiner*—R. S. Bell
*Attorney*—Eugene M. Whitacre

ABSTRACT: A threshold digital switch circuit for a television receiver remote control system includes a transistor having its collector-emitter electrodes operably connected with the receiver's control circuit. Remotely transmitted signals are picked up by a microphone associated with the television receiver, amplified and applied to a resonant circuit which is coupled to the base electrode of the transistor by means including a neon tube switch. When the signal voltage at the tube reaches a threshold level, actuating the neon tube, signal current flows through the neon tube and into the transistor's base electrode causing the transistor's emitter-collector current path to be conductive. A capacitor connected in the collector electrode circuit of the transistor reduces collector electrode voltage change due to short duration noise voltages which may render the transistor momentarily conductive.

PATENTED NOV 30 1971 3,624,510
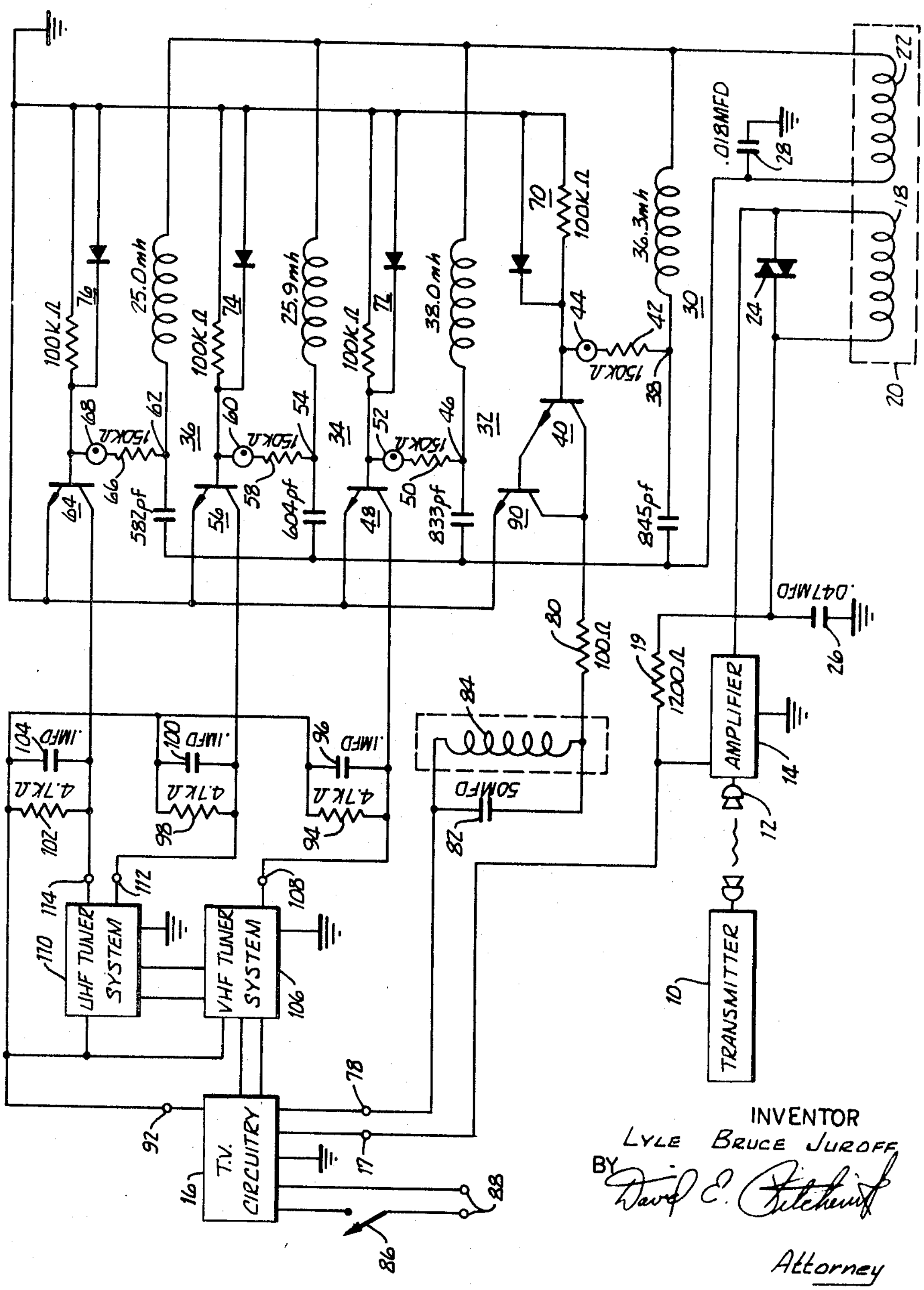
INVENTOR
LYLE BRUCE JUROFF
BY David E. Pitchenik
Attorney

THRESHOLD DIGITAL SWITCH CIRCUIT FOR REMOTE CONTROL SYSTEM

The present invention relates to remote control systems, and more particularly, to a threshold digital switch for a remote control system.

Various types of wireless remote control systems have heretofore been proposed wherein a local transmitter is caused to radiate radio or sound control signal waves having a predetermined frequency or a modulation characteristic for reception by, and control of, remotely located apparatus.

Systems of this type have been commonly used to control the operation of remotely located radio or television receivers by enabling the listener or viewer to adjust the tuning or volume, etc., without moving to the receiver location.

In prior art remote control systems, relay switches have frequently been employed with the relay winding obtaining its operating current through a bipolar transistor switch. The characteristic of the relay switch is such that a threshold level of current through the relay winding is required to close the relay switch contacts, and a lesser level of current through the winding is required to maintain the relay contacts closed. Thus, the relay provides the remote control system with a current threshold level for operation which insures a sharp transition actuation (relay contact closing) point and a subsequent lower current level, analogous to a negative resistance characteristic, for continuance of the actuation condition. Because of the relay characteristic, even when a marginal level of current is present which actuates the contacts, more than sufficient current is present to maintain the actuation without intermittent relay contact closings.

The mechanical inertia of the relay switch contacts which must be overcome in actuating the system provides a time delay, and therefore, a degree of protection against actuation of remote circuits when the frequency of spurious radiation from electronic equipment (for systems using radio waves), or random waves from jingling keys or coins (for systems using sound waves), corresponds to the frequency of the control signal. Such spurious signals are generally present for only short periods of time and do not persist beyond the time delay afforded the system by the inertia of the relay switch contacts.

The relay switch additionally provides protection against intermittent degraded operation due to fluctuating relay winding current caused by fluctuating control signal waves received at the electronic apparatus remote control pickup device. The fluctuating signal waves may be caused by additive and subtractive interference patterns developed between the radiated signal waves and reflections of the wave from various surfaces in the surrounding area. Where such relay winding current fluctuations are present, and the fluctuations are between the actuation threshold level and the lower sustaining or maintaining level, intermittent relay contact closings will not occur because of the relay characteristic.

Where the control apparatus is electronic, that is, having no mechanical switch contact, and analog in nature, as for example the control systems described in two U.S. Pat. applications entitled, "Control System," filed May 31, 1968, in the names of Leopold A. Harwood (Ser. No. 733,640) and Lawrence M. Lunn (Ser. No. 733,548)now U.S. Pat. No. 3,575,612, and assigned to the Radio Corporation of America, intermittent operation is not critical to the functioning of the apparatus. Consequently, the absence of relay switches, with their attendant protection, is not significant. Intermittent operation, as with the circuits described in the above patent applications, usually results in minor changes in the rate of accumulation or reduction of charge on a storage capacitor, affecting the conductivity of a field-effect transistor. However, since the radio or television function is being controlled in an analog manner, there is no drastic change in the controlled function. Basically, the intermittent operation constitutes a multiple "firing" of an AC operated neon tube DC switch connected to the storage capacitor, the AC signal flowing through the capacitor to a point of fixed reference potential and the DC current charging or discharging the capacitor, as the case may be. The change in rate of charging due to intermittent operation is usually so minor that the ultimate resultant effect in the radio or television function being controlled may not be perceptible to the listener or viewer.

Where the controlled apparatus is electronic and digital in nature, as for example the diode switched tuner system described in the patent granted to W. M. Kaufman et al., U.S. Pat. No. 3,264,566, both erroneous actuation and intermittent operation of the apparatus are equivalent to transmitting multiple control signal wave "commands" and the controlled apparatus will function multiply (in the Kaufman et al. system, the ring counter would be triggered and go to succeeding conditions thereby biasing different ones of the diode switches).

In a system of the type including apparatus with control means for controlling functions of the apparatus, a circuit embodying the present invention includes a three terminal switching device having a first and a second terminal operably connected with the control means and a third control terminal for controlling the conductivity of the first-second terminal current path. Means providing a source of electrical signals of a predetermined frequency are coupled to the control electrode of the switching device by a threshold switch means to apply the signals to the third control terminal to control the conductivity of the first-second terminal current path. The threshold level of the switch means is such that when the threshold switch means is actuated, the first-second terminal current path is fully conductive.

A complete understanding of the present invention may be obtained from the following detailed description of a specific embodiment thereof, when taken in conjunction with the accompanying drawing, in which:

The single FIGURE is a schematic circuit diagram, partly in block form, of a threshold digital switch circuit for a remote control system embodying the present invention.

Reference is now made to the single FIGURE. A transmitter 10, which may be of the hand-held variety, transmits a control signal wave at one of several predetermined frequencies. The signal is received by the remote control pickup device 12 and conveyed to an amplifier 14. The source of operating potential for the amplifier 14 is derived from the television circuitry 16 at a terminal 17. Amplified control wave signals are applied to the primary winding 18 of a transformer 20 and inductively coupled to the transformer's secondary winding 22. A varistor 24 (nonlinear voltage responsive resistor whose resistance decreases with increasing voltage) is connected across the primary winding 18 to prevent spike voltages from developing across the winding which may adversely affect the control circuits. One side of the primary winding 18 is connected to a point of fixed reference potential, shown as ground, by a capacitor 26, and to the terminal 17 by a resistor 19. Operating potential for the last stage of amplifier 14 is thus obtained through the primary winding 18. One side of the secondary winding 22 is connected to the point of fixed reference potential by a capacitor 28.

Four series resonant circuits 30, 32, 34, and 36 are connected across the secondary winding 22. The value of the components of the several series tuned circuits, as shown in the drawing, are apportioned such that the circuits are resonant at 28.75 kHz., 27.25 kHz., 40.25 kHz., and 41.75 kHz., respectively. Each series resonant circuit junction is connected to the base electrode of an NPN transistor by the series combination of a resistor and a neon tube. Thus, junction 38 is connected to the base electrode of a transistor 40 by a resistor 42 and a neon tube 44; junction 46 is connected to the base electrode of a transistor 48 by a resistor 50 and a neon tube 52; junction 54 is connected to the base electrode of a transistor 56 by a resistor 58 and a neon tube 60; and, junction 62 is connected to a transistor 64 by a resistor 66 and a neon tube 68.

When a selected one of the series resonant circuits 30, 32, 34, or 36 is energized at its resonant frequency by signals from the secondary winding 22, a large voltage is developed at the junction of the inductor and capacitor comprising the series resonant circuit. The developed voltage at the junction increases exponentially over several cycles to approximately 200 volts peak-to-peak. When the junction voltage has risen to approximately 160 volts peak-to-peak, the neon tube connected to the junction will be actuated or ignited.

After the neon tube has been actuated, due to the negative resistance characteristic of neon tubes, the voltage across the neon tube reduces to approximately 110 volts peak-to-peak (neglecting the base-emitter or diode junction voltage drop which for silicon devices is about 0.7 volts). The current flowing through the neon tube is primarily determined by the resistance of the resistor coupled between the junction and the neon tube. During positive half cycles, after neon tube conduction has occurred, the NPN transistor becomes conductive, permitting a flow of current through its collector-emitter current path. As will be explained more fully hereinafter, while neon tube conduction continues, because of the voltage gradient across the resistor, the current flowing through the neon tube and into the base electrode of the transistor, during positive half cycles, is sufficient to insure that the collector-emitter current path through the transistor is fully conductive. The base to emitter current path of the transistor provides the current path to ground for the neon tube current flow during positive half cycles, and during negative half cycles the neon tube current path to ground is through one of the parallel resistor-diode circuits 70, 72, 74, and 76. The diodes in these circuits prevent an excessive voltage from developing at the base electrode of the transistors during the negative half cycles.

The transistor 40 has its collector electrode connected to a point of operating potential derived from the television circuitry 16 at a terminal 78 by a resistor 80 and the parallel combination of a capacitor 82 and a bistable relay winding 84. The bistable relay, not shown, is connected as a power switch for the television circuitry 16 to turn the circuitry on and off. The terminal 78 is energized from a standby power transformer which supplies power to the terminal when master switch 86 is closed. Closing master switch 86 applies the AC potential at the terminals 88 to the television circuitry and, hence, to the standby power transformer. As transistor 40 alone may be unable to provide a sufficient current to adequately energize the bistable relay winding 84, it is connected in Darlington configuration with a transistor 90.

The transistors 48, 56, and 64 each have their collector electrodes connected to a 5 volt source of operating potential derived from the television circuitry 16 at a terminal 92 by a parallel connected resistor and capacitor. Transistor 48 is connected to terminal 92 by resistor 94-capacitor 96; transistor 56 by resistor 98-capacitor 100; and transistor 64 by resistor 102-capacitor 104. In addition, the collector electrode of the transistor 48 is connected to a VHF tuner system 106 at terminal 108, and the collector electrodes of the transistors 56 and 64 are each connected to a UHF tuner system 110 at terminals 112 and 114, respectively.

When the television circuitry is activated by closing the bistable relay and causing the television receiver's power transformer to be energized, the terminal 92 provides an operating potential to the transistors 48, 56 and 64; to the VHF tuner system 106; and to the UHF tuner system 110. Thereafter, when one of the several series tuned circuits, as for example circuit 32, is energized by signals of a frequency which cause it to resonate, the high voltage developed at the junction 46 is applied via the resistor 50 to the neon tube 52. As previously mentioned, the voltage at the junction 46 exponentially rises to approximately 200 volts peak-to-peak. However, after several cycles, a sufficient voltage is developed (approximately 160 volts) to actuate the neon tube 52, causing it to be conductive.

Once the neon tube has been actuated, the voltage across the neon tube reduces to approximately 110 volts peak-to-peak which is required to keep the tube ionized. Consequently, when the voltage at the junction finally reaches 200 volts, a voltage gradient of 90 volts exists across the 150 kilohm resistor 50, and approximately 0.6 milliamperes flows through the resistor 50-neon tube 52 series circuit. With the transistor 48 being operated with a 5 volt supply through a 4.7 kilohm collector resistor 94 and assuming a typical Beta of 100 for a silicon transistor, a current of 10.6 microamperes flowing into the transistor's base electrode will cause the transistor's collector-emitter current path to be saturated. Thus, a voltage gradient across the 150 kilohm resistor 50 of only 1.6 volts will supply the required 10.6 microamperes to the base electrode of the transistor. Hence, large voltage fluctuations at the junction 46 will not affect the circuit operation so long as it remains above approximately 111.6 volts (1.6 volts above the 110 volt maintaining voltage for the neon tube). Consequently, a voltage fluctuation of slightly more than 88 volts can be tolerated. This allows an ample voltage margin for the loading effect of the junction due to current flow and variations due to component nonuniformity. It should be noted that the Darlington connected transistors 40 and 90 may have a typical composite Beta of 1,000 and, therefore, require less base current to saturate the collector-emitter current path, depending, of course, also on the operating voltage and collector resistor.

The neon tube 52 provides a distinct threshold level of voltage which must be developed at the junction 46 to cause ignition. In turn, this can be translated back through the system to a distinct minimum threshold level of control wave signal received at microphone 12 which is required to develop the threshold voltage at junction 46. Moreover, after the neon tube 52 has been actuated, fluctuation of the level of control wave signal at the microphone 12 will no affect the continued conduction of the neon tube 52 so long as the translation of the fluctuating signal through the system does not result in a reduction of the voltage at junction 46 below the required level.

Throughout the period of collector-emitter conduction of transistor 48, the capacitor 96 will charge, and after several charging cycles, will reach its fully charged state. Once the capacitor 96 has become fully charged, it will maintain the collector electrode of the transistor 48 at its low potential value during the negative half cycle at the base electrode of the transistor. Thus, while a spurious noise signal may develop at the junction 46, which because of its magnitude overcomes the threshold level for actuation of the neon tube 52, causing transistor 48 to conduct, it will often be of an insufficient duration to substantially change the charge on capacitor 96, and therefore will not affect the operation of the system. The circuits involving the transistors 56 and 64 operate in a similar manner to that of transistor 48.

What is claimed is:

1. In a system of the type including apparatus with control means for controlling functions of said apparatus, a circuit comprising:

a three terminal switching device having a first and a second terminal operably connected with said control means to render said function operable when said first-second terminal current path is biased into saturation and a third control terminal for controlling the conductivity of said first-second terminal current path;

means providing a source of electrical signals of predetermined frequency;

threshold switch means, coupled between said source of electrical signals and said third control terminal, for applying said signals to said third terminal to control the conductivity of said first-second terminal current path, the threshold level of said switch means being such that the signal level required to actuate said switch means is sufficient to cause said first-second terminal current path to be biased into saturation;

coupling means for connecting the junction of the control electrode of said three terminal switching device and said threshold switch means with another electrode of said three terminal switching device; and the control-first electrode current path of said three terminal switching device being part of a first current path for current flowing through said threshold switch means due to half-cycles of said signals of a first polarity and said coupling means being part of a second current path for current flowing through said threshold switch due to half-cycles of said signals of a second polarity.

2. A circuit as defined in claim 1 wherein said threshold switch means includes a gaseous switch tube.

3. A circuit as defined in claim 1 wherein said threshold switching means comprises a resistor and a gaseous switch tube connected in series.

4. A circuit as defined in claim 3 wherein said gaseous switch tube is a neon tube.

5. A circuit as defined in claim 4 wherein said three terminal switching device is a bipolar transistor having a collector electrode, an emitter electrode and a base electrode.

6. A circuit as defined in claim 5 including a capacitor and a resistor connected in parallel and coupled between one of the electrodes of said transistor and a point of operating potential.

7. A circuit as defined in claim 6 wherein said coupling means includes a diode coupled between the base electrode of said transistor and a point of fixed reference potential.

8. A circuit as defined in claim 7 wherein said means providing a source of electrical signals includes a series resonant circuit.

9. A circuit as defined in claim 1 including a capacitor coupled between one of the terminals of said three terminal switching device and a source of operating potential.

10. A circuit as defined in claim 1 wherein said coupling means includes a diode and a resistor connected in parallel.

11. In a radio receiver of the type including a remote control system to control functions of said receiver, a circuit comprising:

a transistor having its emitter-collector electrodes operably connected with said receiver remote control system to render said function operable when said emitter-collector electrode current path is biased into saturation;

means for detecting remotely generated signals;

amplification means coupled to said detector means for amplifying said detected signals;

a resonant circuit coupled to said amplifier means;

first coupling means for connecting said resonant circuit to the base electrode of said transistor, said first coupling means including a gaseous switch tube, said gaseous switch tube ignition threshold level such that the signal level required to ignite said tube will cause said emitter-collector electrode current path to be biased into saturation;

second coupling means for connecting the junction of the base electrode of said transistor and said first coupling means with another electrode of said transistor; and the base-emitter electrode current path of said transistor being part of a first current path for current flowing through said switch tube due to half-cycles of said detected signals of a first polarity, and said second coupling means being part of a second current path for current flowing through said switch tube due to half-cycles of said detected signals of a second polarity.

12. A circuit as defined in claim 11 including a capacitor connected between one of the electrodes of said transistor and a point of potential to reduce the voltage change at said one electrode due to detected short duration signals which momentarily cause the conductivity of said emitter-collector electrode current path to vary.

13. A circuit as defined in claim 12 wherein said gaseous switch tube is a neon switch tube.

14. A circuit as defined in claim 11 wherein said second coupling means is connected between the base and emitter electrodes of said transistor.

15. A circuit as defined in claim 14 wherein said second coupling means includes a diode and a resistor connected in parallel.

* * * * *